(12) United States Patent
Schmandt et al.

(10) Patent No.: US 8,356,701 B2
(45) Date of Patent: Jan. 22, 2013

(54) DRUM-IN-HAT DISC BRAKE ASSEMBLY

(75) Inventors: Anthony Schmandt, Walled Lake, MI (US); Brian Boyle, Farmington Hills, MI (US); David Kwierant, Ann Arbor, MI (US); Harry D. Miller, Canton, MI (US); Eduardo Morais, South Lyon, MI (US)

(73) Assignee: Kelsey-Hayes Company, Livonia, MI (US)

( * ) Notice: Subject to any disclaimer, the term of this patent is extended or adjusted under 35 U.S.C. 154(b) by 815 days.

(21) Appl. No.: 12/144,701

(22) Filed: Jun. 24, 2008

(65) Prior Publication Data
US 2009/0314593 A1 Dec. 24, 2009

(51) Int. Cl.
*F16D 65/22* (2006.01)
(52) U.S. Cl. .............. 188/206 R; 188/218 R; 188/106 P
(58) Field of Classification Search .................. 188/325, 188/205 R, 206 R, 206 A, 73.31, 106 P, 18 A, 188/218 R, 218 A, 218 XL
See application file for complete search history.

(56) References Cited

U.S. PATENT DOCUMENTS

| 5,322,145 | A | 6/1994 | Evans |
| 5,715,916 | A * | 2/1998 | Fanelli et al. .............. 188/106 A |
| 6,360,852 | B1 * | 3/2002 | Sherman et al. ............ 188/70 R |
| 6,729,444 | B1 | 5/2004 | Schmandt et al. |
| 2005/0145451 | A1 | 7/2005 | Kelly et al. |
| 2007/0227840 | A1 * | 10/2007 | Smith et al. ................ 188/250 F |

FOREIGN PATENT DOCUMENTS
WO   WO 2007089300 A2 *  8/2007

* cited by examiner

*Primary Examiner* — Robert A Siconolfi
*Assistant Examiner* — Anna Momper
(74) *Attorney, Agent, or Firm* — MacMillan, Sobanski & Todd, LLC

(57) ABSTRACT

A drum-in-hat (DIH) disc brake assembly has a disc service brake, a DIH parking and emergency brake, and a parking brake anchor. A backing plate, an axle flange, and a caliper bracket each have at least two mounting apertures formed therethrough. The parking brake anchor includes a bracket portion having a pair of studs extending axially outwardly therefrom. The studs are structured and configured to extend through the respective mounting apertures of the backing plate, the axle flange, and the caliper bracket for securing the caliper bracket, parking brake anchor, and the backing plate to the axle flange.

4 Claims, 10 Drawing Sheets

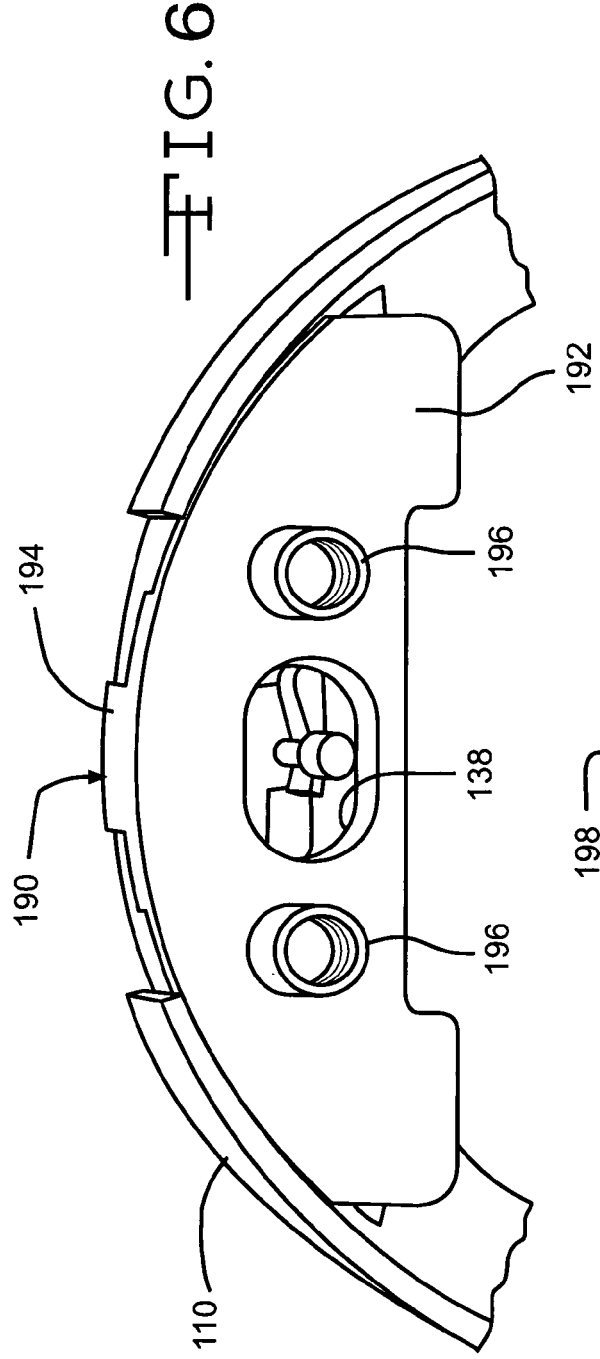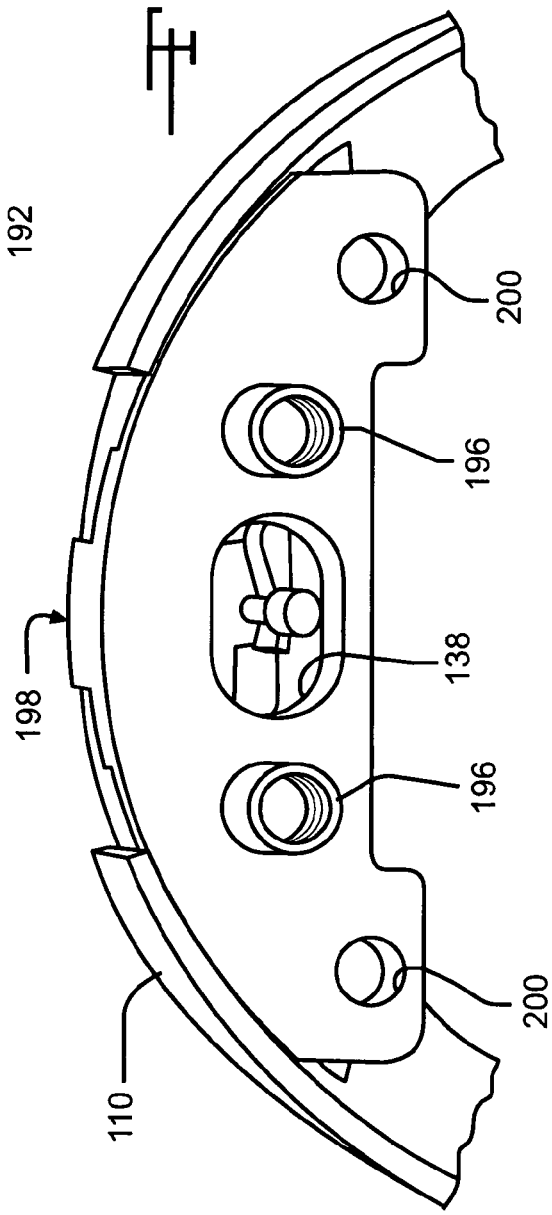

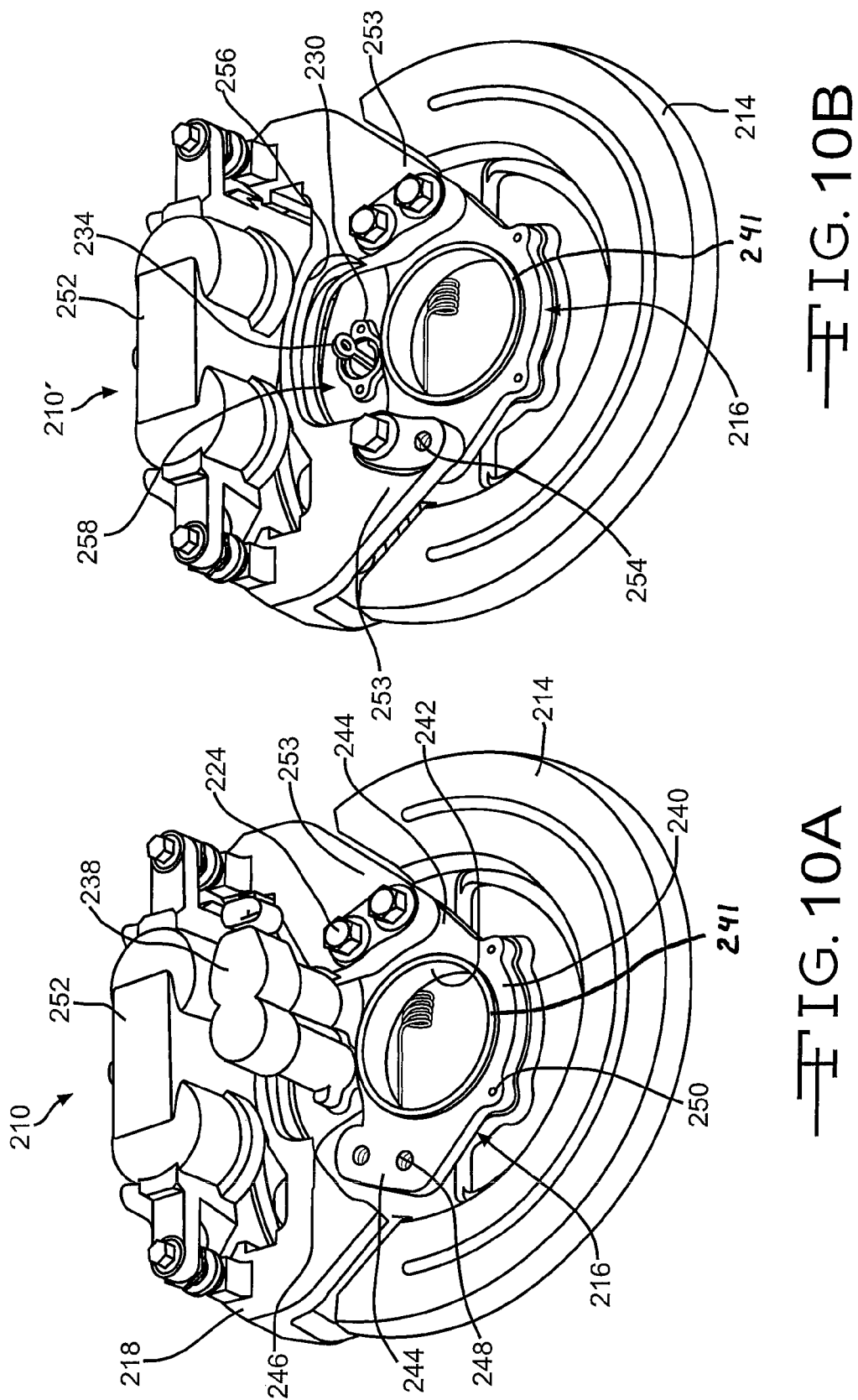

DRUM-IN-HAT DISC BRAKE ASSEMBLY

BACKGROUND

Various embodiments of vehicle drum and disc brake assemblies are described herein. In particular, the embodiments described herein relate to improved structures for a backing plate, a caliper bracket, an axle flange, and a parking brake anchor for use in a vehicle drum-in-hat disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. In some instances, the disc brake assembly can be a "drum-in-hat" type of disc brake assembly. The brake assemblies are actuated by hydraulic pressure or pneumatic pressure generated when an operator of the vehicle depresses a brake pedal. The structures of these drum brake assemblies and disc brake assemblies, as well as the actuators therefore, are well known in the art.

A typical drum-in-hat type of disc brake assembly includes a hydraulically or pneumatically actuated disc service brake and a mechanically actuated drum-in-hat parking and emergency brake. The disc service brake includes a rotor which is secured to the wheel of the vehicle for rotation therewith. The rotor includes a pair of opposed friction plates, which are selectively engaged by portions of a caliper assembly. The interior of the rotor defines a cylindrical braking surface.

A caliper assembly is slidably supported by pins secured to a mounting flange. The mounting flange is secured to a non-rotatable component of the vehicle, such as the steering knuckle or the axle flange. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

The drum-in-hat parking and emergency brake includes a pair of opposed arcuate brake shoes which are supported on a backing plate for selective movement relative thereto. The backing plate is secured to the mounting flange, or alternatively, can be formed integral therewith. Each of the brake shoes has a friction pad or lining secured thereto. The brake shoes extend within the cylindrical braking surface of the rotor. To effect parking and emergency braking action, the operator of the vehicle manually pulls an actuating lever. The lever is connected to an actuation cable having a park brake cable end which, when pulled, actuates a mechanical actuating mechanism. The actuating mechanism is located adjacent one of the ends of the brake shoes and is operative to move the brake shoes outwardly apart from one another such that the friction pads frictionally engage the cylindrical braking surface of the rotor. Such frictional engagement causes slowing or stopping of the rotational movement of the rotor and, therefore, the wheel of the vehicle in a controlled manner.

US Patent Application Publication No. 2005/0145451 discloses a vehicle brake assembly having a drum-in-hat adapter 12. The adapter 12 is a relatively large stamped part having a large opening 20 for receiving the outer end of an axle.

U.S. Pat. No. 6,729,444 discloses a drum-in-hat disc brake assembly also having a relatively large drum-in-hat adapter 14. The adapter 14 is a relatively large stamped part having a large opening 22 for receiving the outer end of an axle.

U.S. patent application Ser. No. 12/004,127 discloses an improved structure for a parking brake actuator 25 for a vehicle drum-in-hat disc brake assembly.

US Patent Application Publication No. 2007/0227840 discloses drum-in-hat disc brake assembly wherein a first fastener is provided for securing the abutment tower to the caliper bracket assembly. A plurality of second fasteners is provided for securing the caliper bracket assembly and the shield to the axle flange.

SUMMARY

The present application describes various embodiments of a vehicle drum-in-hat disc brake assembly. In one embodiment, the drum-in-hat disc brake assembly has a disc service brake and a drum-in-hat parking and emergency brake, and further includes a backing plate adapted to support a drum brake shoe assembly of the drum-in-hat parking and emergency brake. The backing plate has a centrally located opening defining an axis and at least two smaller mounting apertures formed therein about the centrally located opening thereof. The drum-in-hat disc brake assembly also includes a parking brake anchor and an axle flange. The axle flange has at least two mounting apertures formed therein, and is structured and configured to be secured to an axle tube which in turn is structured and configured to extend through the centrally located opening of the backing plate. The drum-in-hat disc brake assembly also includes a caliper bracket adapted to support a disc brake caliper assembly of the disc service brake, wherein the caliper bracket has at least two mounting apertures formed therein. The parking brake anchor includes a bracket portion having a pair of studs extending axially outwardly therefrom. The studs are structured and configured to extend through the respective mounting apertures of the backing plate, the axle flange, and the caliper bracket for securing the caliper bracket, parking brake anchor, and the backing plate to the axle flange.

Other advantages of the vehicle drum-in-hat disc brake assembly will become apparent to those skilled in the art from the following detailed description, when read in light of the accompanying drawings.

BRIEF DESCRIPTION OF THE DRAWINGS

FIG. 6 is a plan view of the parking brake anchor illustrated in FIG. 5.

FIG. 7 is a plan view of an alternate embodiment of the anchor illustrated in FIG. 5.

FIG. 10A is a perspective view of a portion of a third embodiment of the drum-in-hat disc brake assembly.

FIG. 10B is a perspective view of a portion of a forth embodiment of the drum-in-hat disc brake assembly.

DETAILED DESCRIPTION

Figure 1:
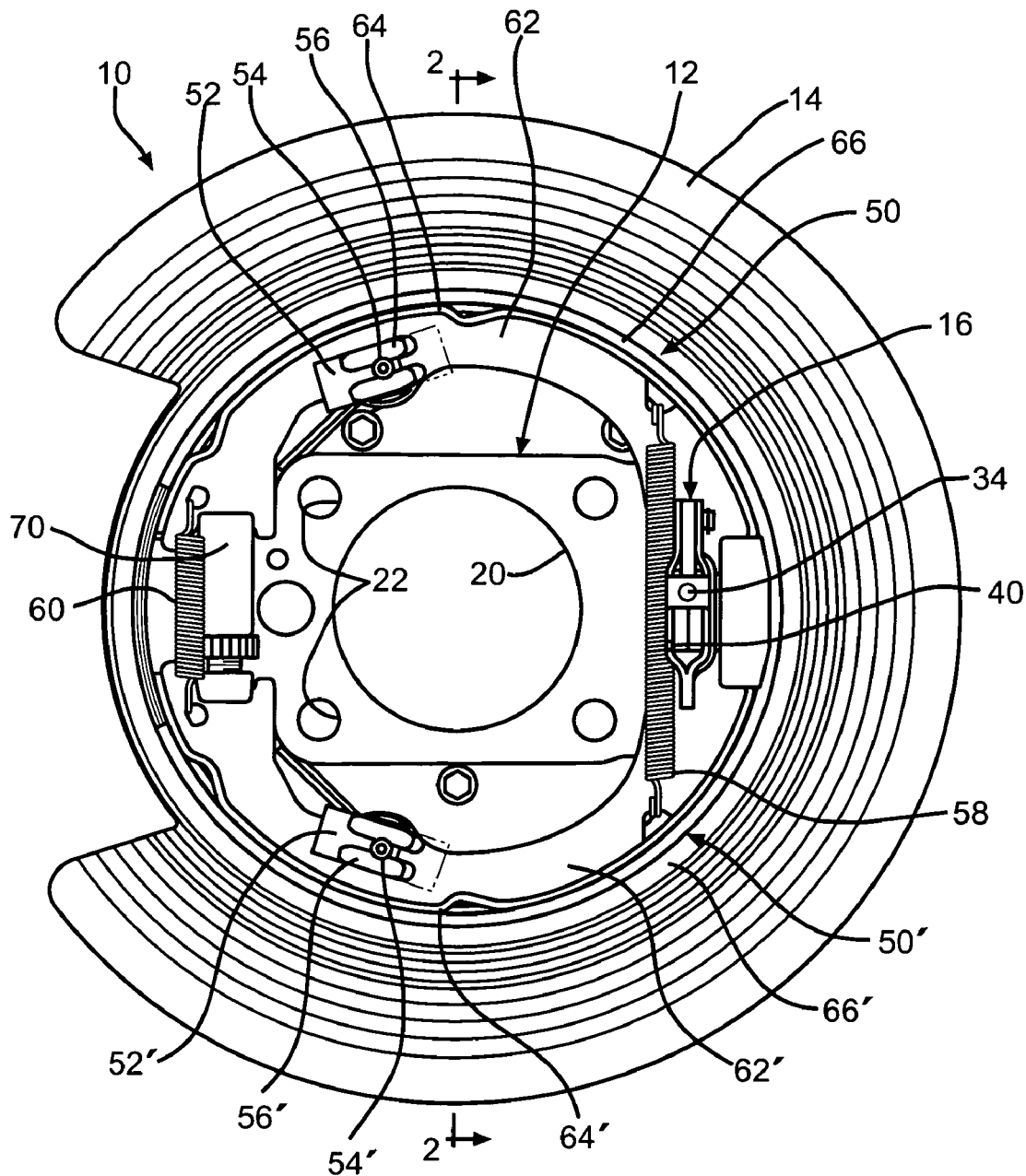
FIG. 1 is an outboard side elevational view of a prior art vehicle drum-in-hat disc brake assembly.

A known vehicle drum-in-hat disc assembly is indicated generally at 10 in FIG. 1. The actuator includes an adjustable rivet 34 for eliminating dimensional tolerances in the like assembly 26. FIG. 1 an outboard side elevational view of a prior art vehicle drum-in-hat disc brake assembly, indicated generally at 10. The vehicle drum-in-hat disc brake assembly 10 includes a hydraulically or pneumatically actuated disc service brake (not shown), and a drum-in-hat parking and emergency brake. In the illustrated embodiment, the vehicle drum-in-hat parking and emergency brake is a sliding shoe type of brake. The general structure and operation of the vehicle drum-in-hat disc brake assembly is conventional in the art.

As shown in FIG. 1, the illustrated vehicle drum-in-hat disc brake assembly 10 includes a drum-in-hat adapter assembly 12, a backing plate 14, and a drum-in-hat parking and emergency brake portion, indicated generally at 16. The adapter assembly 12 includes a drum-in-hat adapter portion 2 and an axle flange portion 4 formed integrally therewith. The adapter assembly 12 is illustrated as being a one-piece casting and is adapted for enclosing a rotatable axle (not shown). To accomplish this, the adapter assembly 12 includes a relatively large opening 20 and a plurality of smaller lug bolt mounting holes 22 formed therein about the opening 20. The opening 20 permits an outer end of an axle to extend therethrough to the vehicle wheel (not shown), and suitable fasteners (not shown), are disposed in the lug bolt mounting holes 22 to secure the adapter assembly 12 to the associated vehicle component.

The adapter assembly 12 further includes an abutment (not shown) integrally cast with the drum-in-hat adapter assembly 12. The illustrated backing plate 14 of the drum-in-hat disc brake assembly 10 is preferably a stamped metal backing plate and includes a relatively large central opening (not shown) and a plurality of smaller openings (not shown) formed therein about the central opening 20 of the drum-in-hat adapter assembly 12. The central opening permits an outer end of the rotatable axle (not shown) to extend therethrough to a wheel (not shown) of the vehicle. The smaller openings are adapted to receive suitable fasteners, such as threaded mounting studs (not shown).

Such studs may extend through the openings formed in the backing plate 14 and the openings 22 drum-in-hat adapter assembly 12. The threaded ends of the studs may be threadably received in threaded openings (not shown) provided in the associate vehicle component to secure the backing plate 14 and the drum-in-hat adapter assembly 12, and therefore the drum-in-hat disc brake assembly 10, to the associated vehicle component. Alternatively, the backing plate 14 and/or the drum-in-hat adapter assembly 12 can be secured to one another and/or can be secured to the associated vehicle component by other methods.

The vehicle drum-in-hat disc brake assembly 10 further includes a pair of brake shoes 50 and 50' supported thereon by conventional pivot pin and spring-clip assemblies, indicated generally at 52. Each of the assemblies 52 includes a pin 54 which extends through an opening (not shown) of the backing plate 14 and through associated opening (not shown) provided in the brake shoes 50 and 50'. The pins 54 have outer ends which are adapted to be fastened or secured to clips 56 of the spring-clip assemblies 52 to secure the brake shoes 50 and 50' to the backing plate 14 in a conventional manner. The illustrated drum-in-hat brake assembly 10 also includes a first retraction spring 58 and a second retraction spring 60. The exemplary retraction springs 58 and 60 are illustrated as a pair of retraction springs. It will be understood however, that the only a single retraction spring, such as either the spring 58 or the spring 60 may be provided.

The drum-in-hat parking and emergency brake portion 16 of the brake assembly 10 includes the pair of brake shoes 50 and 50' supported on the backing plate 14. Structurally, the brake shoes 50 and 50' are essentially mirror images of one another, and like reference numbers are used to indicate similar parts. The brake shoes 50 and 50' include respective web portions 62 and 62' which are generally flat and crescent-shaped. Generally arcuate-shaped rim portions 64 and 64' are secured to the opposed outer curved surfaces of the web portions 62 and 62', such as by welding. A friction pad 66 is secured to the outer arcuate surface of the rim portion 64 of the brake pad 50, while a friction pad 66' is secured to the outer arcuate surface of the rim portion 64 of the brake pad 50'. The vehicle drum-in-hat parking and emergency brake 10 further includes a manual adjusting mechanism, indicated generally at 70, to compensate for thinning of the friction pads 66 and 66' resulting from wear caused by repeated use.

Figure 2:
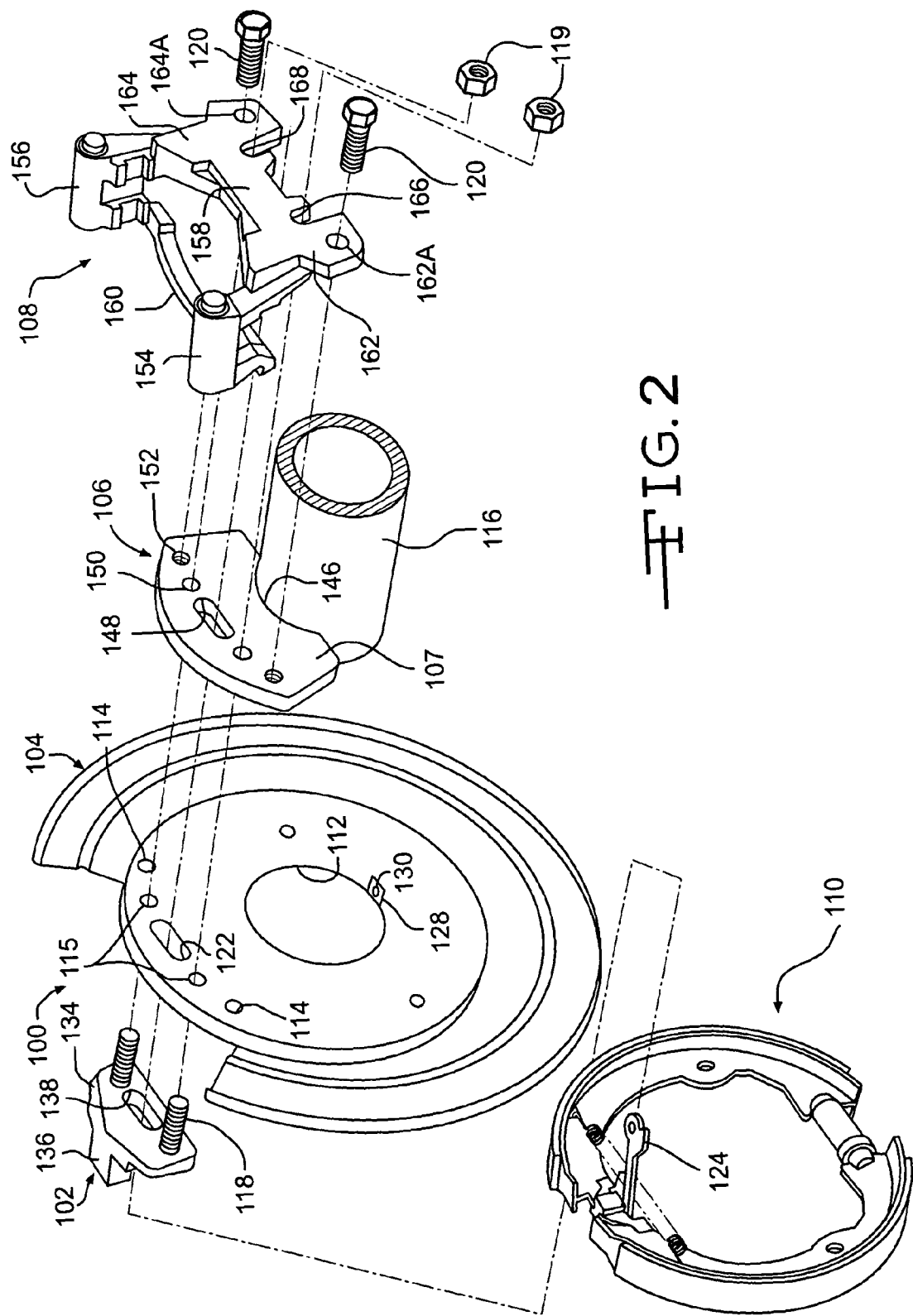
FIG. 2 is an exploded perspective view of a first embodiment of the drum-in-hat disc brake assembly.
Figure 3:
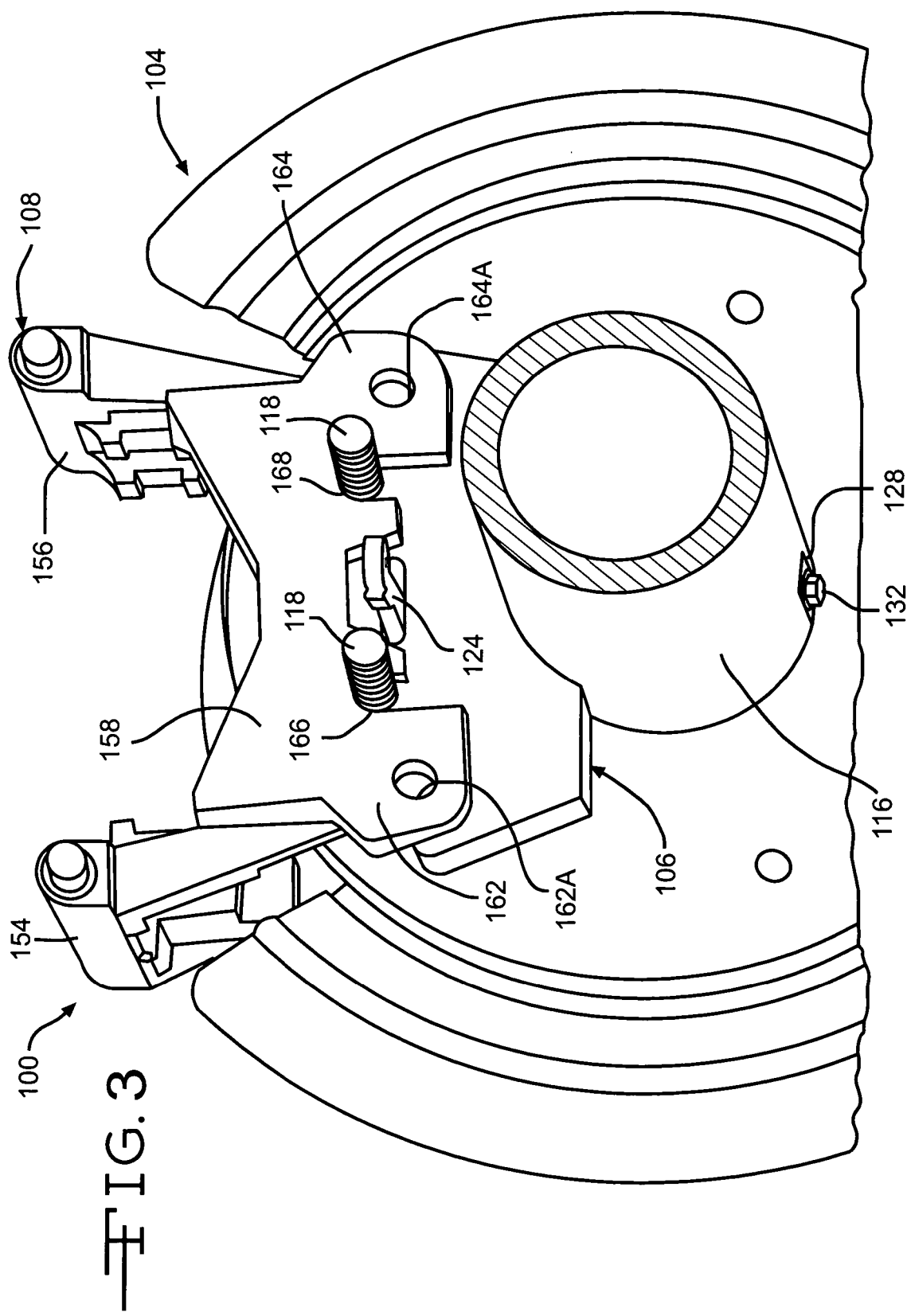
FIG. 3 an enlarged perspective view of a portion of the drum-in-hat disc brake assembly illustrated in FIG. 2.

Referring now to FIGS. 2 and 3 a portion of a first embodiment of a vehicle drum-in-hat disc assembly is indicated generally at 100. The vehicle drum-in-hat disc brake assembly 100 includes a hydraulically or pneumatically actuated disc service brake (not shown), and a drum-in-hat parking and emergency brake. In the illustrated embodiment, the vehicle drum-in-hat parking and emergency brake is a sliding shoe type of brake. The general structure and operation of the vehicle drum-in-hat disc brake assembly is conventional in the art. Thus, only those portions of the vehicle drum-in-hat disc brake assembly which are necessary for a full understanding of this invention will be explained and illustrated in detail.

Although this invention will be described and illustrated in connection with the particular vehicle drum-in-hat disc brake assembly 100 disclosed herein, it will be appreciated that this invention may be used in connection with other sliding shoe types, or pivoted shoe types, of drum-in-hat disc brake assemblies in connection with the associated parking and emergency brake portion if so desired.

As shown in FIGS. 2 and 3, the illustrated vehicle drum-in-hat disc brake assembly 100 includes a drum-in-hat bracket or parking brake anchor 102, a splash shield or backing plate 104, an axle flange 106, a caliper bracket 108, and a drum brake shoe assembly 110.

The illustrated backing plate 104 of the drum-in-hat disc brake assembly 100 is a stamped metal backing plate and includes a relatively large central opening 112 and a plurality of smaller mounting apertures 114 and 115 formed therein about the central opening 112. The central opening 112 permits an axle tube 116, described herein below, to extend therethrough. The smaller mounting apertures 115 are adapted to receive suitable fasteners, such as threaded mounting studs 118 or other threaded fasteners 120.

In the illustrated embodiment, a generally elongated slotted opening 122 is structured and configured to allow a lever arm 124 of a parking brake and emergency brake actuator (not shown) to extend therethrough.

The illustrated backing plate 104 includes a tab 128 extending axially outwardly adjacent the centrally located opening 112. The tab 128 may be formed during the stamping process. The tab 128 has an aperture 130 formed therein and is structured and configured for receiving a threaded fastener 132 for securing the backing plate 104 to the axle tube 116.

Advantageously, the tab 128 provides an economical and relatively simple additional attachment point, i.e., in addition to the mounting apertures 150 and 152 of the axle flange 106 (described in detail below).

The illustrated parking brake anchor 102 is a one-piece casting formed from iron. It will be understood that the brake anchor 102 may be formed from any other desired metal and non-metal. The brake anchor 102 includes a bracket portion or anchor body 134 and an abutment 136. The illustrated abutment 136 is integrally cast with the anchor body 134. The brake anchor 102 further includes a generally elongated slotted opening 138. The slotted opening 138 is structured and configured to allow the lever arm 124 of the parking brake and emergency brake actuator 126 to extend therethrough. A pair of threaded mounting studs 118 extend axially outwardly of the bracket portion 134. The studs 118 are structured and configured to extend through the respective apertures 115, 150, and 166 and 168 of the backing plate 104, the axle flange 106, and the caliper bracket 108, respectively, for securing the caliper bracket 108, parking brake anchor 102, and the backing plate 104 to the axle flange 106. In the illustrated embodiment, the studs 118 are threaded for receiving internally threaded nuts 119.

Figure 8:
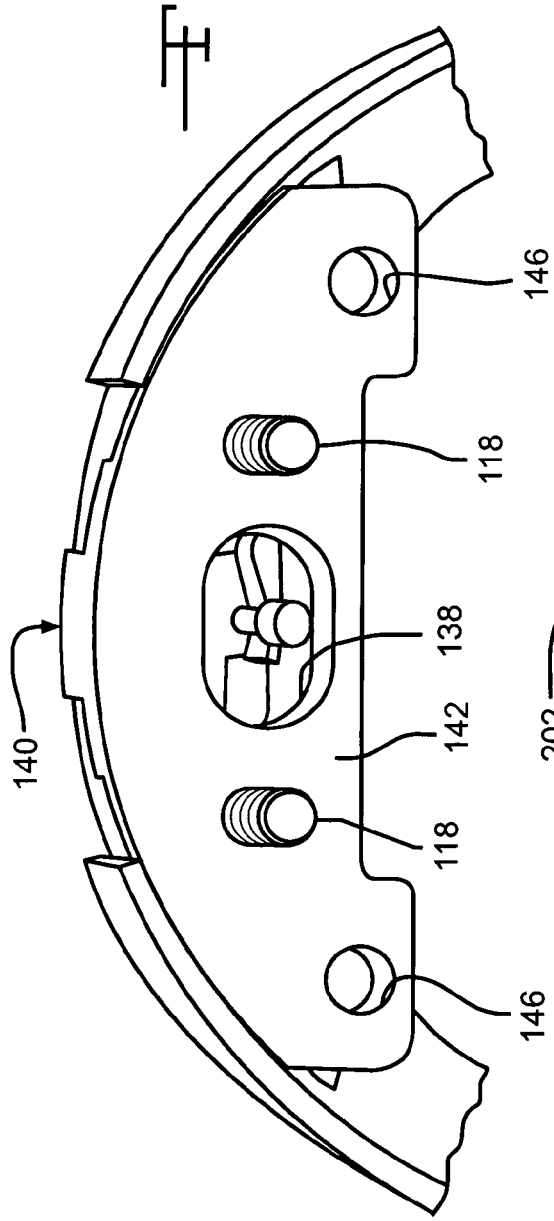
FIG. 8 is a plan view of an alternate embodiment of the anchor illustrated in FIGS. 2 and 3.

A first alternate embodiment of the parking brake anchor is shown generally at 140 in FIG. 8. In the embodiment illustrated in FIG. 8, the parking brake anchor 140 includes a slightly enlarged anchor body 142 relative to the anchor body 134 and includes the slotted opening 138 and the threaded mounting studs 118. Additionally, two mounting apertures 146 are formed outboard of the studs 118, structured and configured to receive other suitable fasteners, such as the threaded fasteners 120, as shown in FIG. 2.

The illustrated axle flange 106 may be a metal forging or stamping and includes a flange portion 107 having a substantially arcuate edge 146 (lower edge when viewing FIG. 2) structured and configured to be secured to an outer surface of the axle tube 116. The illustrated axle flange 106 is welded to the axle tube 116. The flange portion 107 further includes generally elongated slotted opening 148 structured and configured to allow the lever arm 124 of the parking brake and emergency brake actuator (not shown) to extend therethrough. A plurality of smaller mounting apertures 150 and 152 are formed therein outboard of the slotted opening 122. The smaller mounting apertures 150 are structured and configured to receive the threaded mounting studs 118. The mounting apertures 152 are structured and configured to receive other suitable fasteners, such as the threaded fasteners 120.

The illustrated caliper bracket 108 is structured and configured to support a disc brake caliper assembly of the disc service brake and has at least two mounting apertures formed therein. The caliper bracket 108 illustrated in FIG. 2 includes a pair of axially and outwardly extending arms 154 and 156 which are interconnected at their inboard ends by an inner tie bar 158 and at their outboard ends by an outer tie bar 160. The caliper bracket 108 further includes a pair of mounting legs or extensions 162 and 164. In the illustrated embodiment, the legs 162 and 164 extend from the inner tie bar 158.

The mounting leg 162 includes an aperture 162A formed therethrough and a slot 166. The mounting leg 164 includes an aperture 164A formed therethrough and a slot 168. In the illustrated embodiment, the apertures 162A and 164A are non-threaded apertures. Alternatively, the structure of the caliper bracket 108 including the apertures 162A and 164A can be other than illustrated if so desired. The slots 166 and 168 are structured and configured to receive the parking brake anchor studs 118.

The studs 118 may extend through the mounting apertures 114 formed in the backing plate 104, the mounting apertures 150 formed in the axle flange 106, and the slots 166 and 168 of the caliper bracket 108. The studs 118 may secured by threaded nuts (not shown), to secure the backing plate 104, the parking brake anchor 102, the caliper bracket 108 and the axle flange 106, and therefore the drum-in-hat disc brake assembly 100, to the associated vehicle component.

Figure 5:
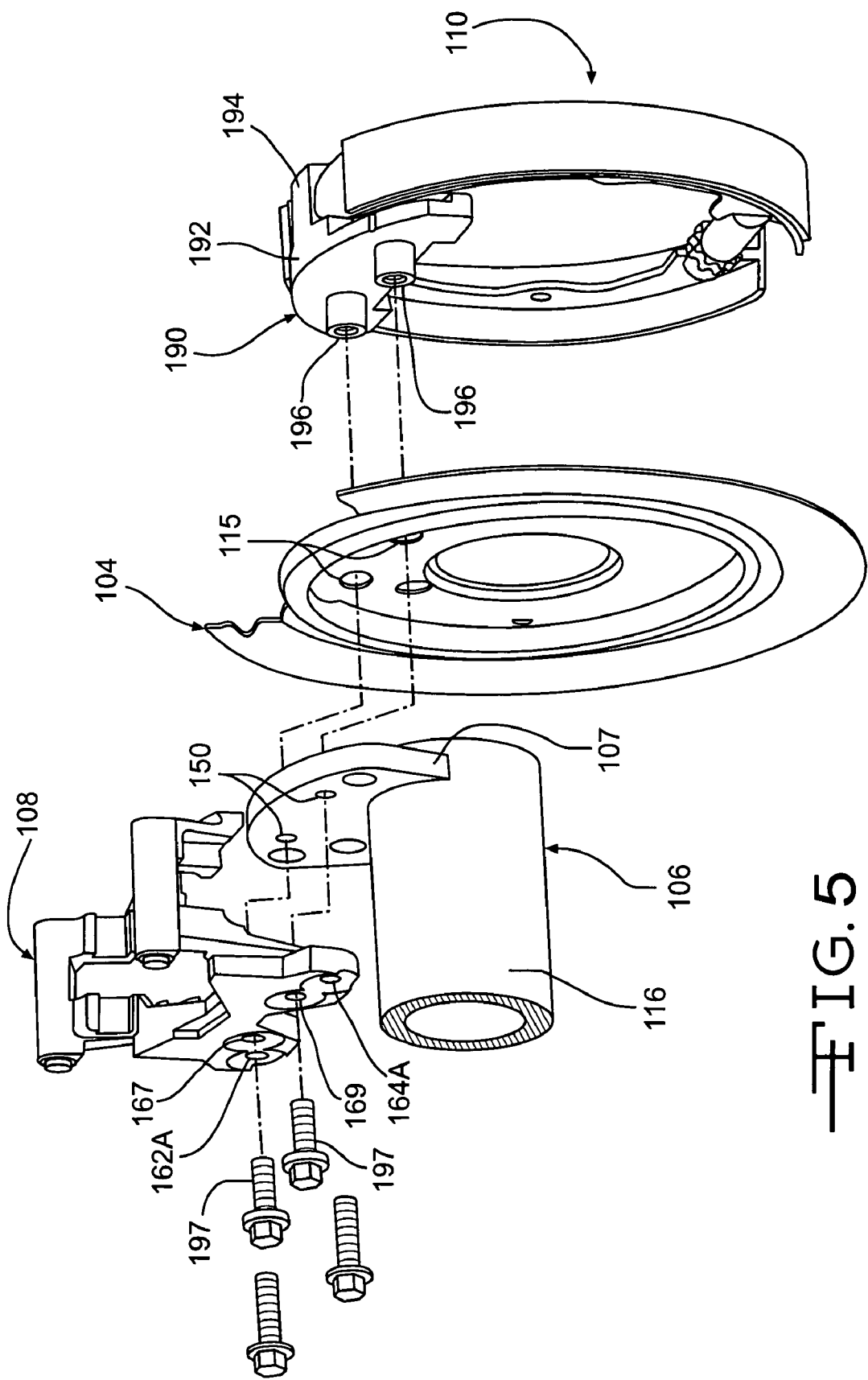
FIG. 5 is an exploded perspective view of a second embodiment of the drum-in-hat disc brake assembly.

Referring now to FIG. 5, the caliper bracket 108 may be formed with the apertures 162A and 164A and a second pair of apertures 167 and 169 in lieu of the slots 166 and 168. Alternatively, the caliper bracket 108 may be formed with only one pair of apertures; either the apertures 162A and 164A or the apertures 167 and 169. The one pair of apertures may be threaded, or if desired, formed without threads.

Figure 4:
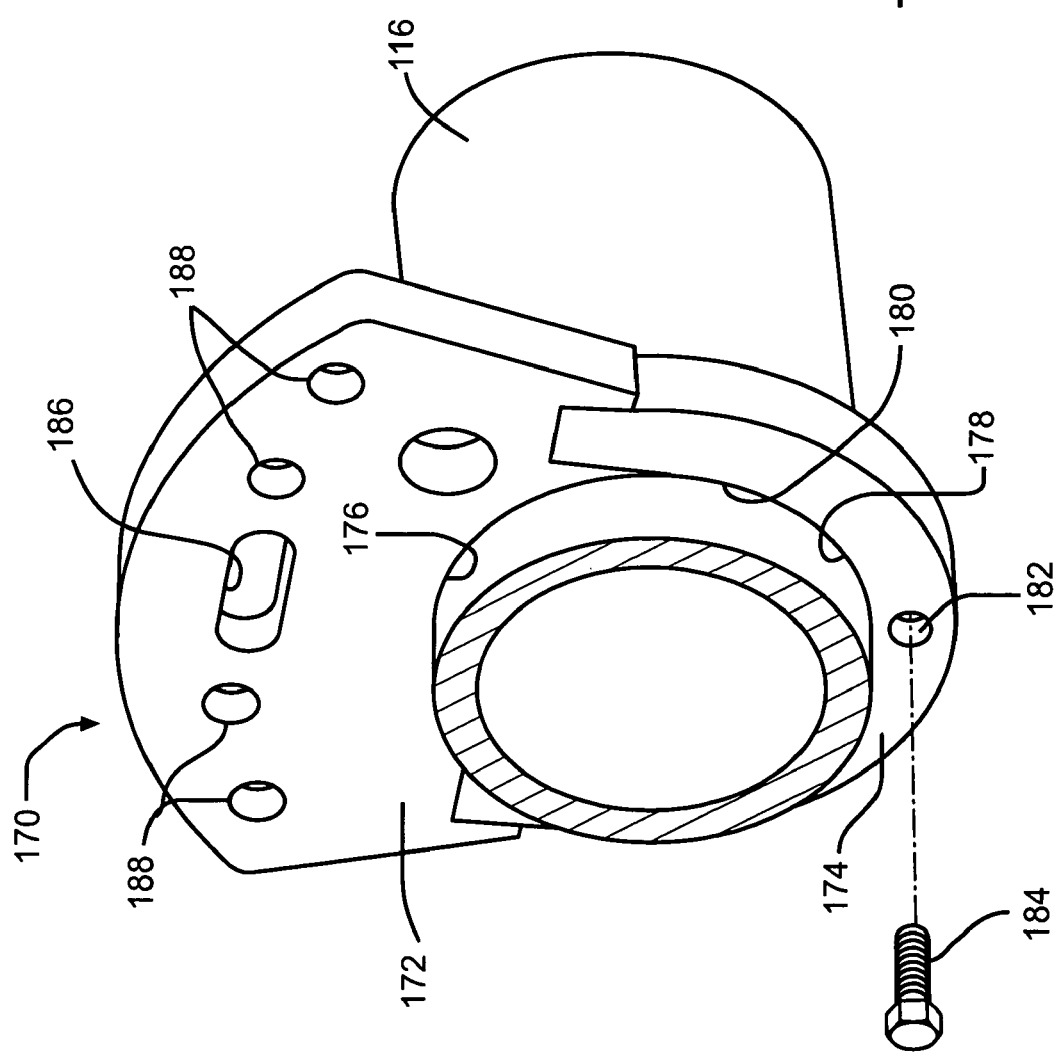
FIG. 4 is an enlarged perspective view of an alternate embodiment of the axle flange illustrated in FIGS. 2 and 3.

Referring now to FIG. 4, an alternate embodiment of the axle flange is shown generally at 170. The axle flange 170 is formed from two components, and includes a flange portion 172 and a substantially U-shaped collar portion 174. In the illustrated embodiment, the collar portion 174 is welded to the flange portion 172. An outer edge surface 176 (lower edge when viewing FIG. 4) of the flange portion 172 and an inner edge surface 178 of the collar portion 174 cooperate to define an opening 180 structured and configured to be secured, such as by welding, to an outer surface of an axle tube 116 extending therethrough. The collar portion 174 includes an aperture 182 formed therein. The aperture 182 is structured and configured for receiving a threaded fastener 184 for securing the axle flange 106 to the backing plate 104. Alternatively, the flange portion 172 and the collar portion 174 need not be welded to one another. For example, if desired the flange portion 172 and the collar portion 174 may be simultaneous welded to the axle tube 116 in a single manufacturing step.

The flange portion 172 further includes a generally elongated slotted opening 186. The slotted opening 186 is structured and configured to allow the lever arm 124 of the parking brake and emergency brake actuator 126 to extend therethrough. The flange portion 172 also includes a plurality of smaller mounting apertures 188 formed therein outboard of the slotted opening 186.

Advantageously, the two-piece axle flange 106 significantly reduces waste associated with prior art axle flanges, such as the axle flange 16 disclosed in U.S. Pat. No. 6,729,444, wherein the opening 72 is formed by stamping and discarding the material removed.

A further advantage is that the axle flange 106 provides 360 degree support of the axle tube 116 and the axle tube 116 may be welded to the axle flange 106 about the entire 360 degrees of its circumference when a stronger connection between the axle tube 116 and the axle flange 106, such as in large trucks or other large vehicles, is desirable.

Referring now to FIGS. 5 and 6, a second alternate embodiment of the parking brake anchor is shown generally at 190. The parking brake anchor 190 includes an anchor body 192 and an abutment 194. The brake anchor 190 further includes the generally elongated slotted opening 138 for the lever arm 124 of the parking brake and emergency brake actuator 126. A pair of stud collars 196 extend axially outwardly of the anchor body 192. The illustrated stud collars 196 have internal threads and are structured and configured to receive threaded fasteners 197 for securing the caliper bracket 108, parking brake anchor 190, and the backing plate 104 to the axle flange 106. The stud collars 196 are further structured and configured to extend through the apertures 115 of the backing plate 104. The stud collars 196 are further structured and configured to extend through at least a portion of the apertures 150 of the axle flange 106. In the illustrated embodiment, the stud collars 196 do not extend completely through the apertures 150 of the axle flange 106.

Referring to FIG. 7, a third alternate embodiment of the parking brake anchor is shown generally at 198. The parking brake anchor 198 is substantially identical to the parking brake anchor 190, but includes two mounting apertures 200 formed outboard of the stud collars 196. The mounting apertures 200 are structured and configured to receive other suitable fasteners, such as the threaded fasteners, such as the fasteners 197 shown in FIG. 5. In the illustrated embodiment, the stud collars 196 are shown as having internal threads. It will be understood however, that such internal threads are not required. For example, stud collars 196 may be provided without threads and be used to allow any type of fastener to pass therethrough, and/or to locate the anchor 198 relative to the backing plate 104 and the axle flange 106.

In the embodiments described above, slotted openings, for example the slotted openings 138, 122, 148 in the parking brake anchor 102, the backing plate 104, and the axle flange 106, respectively, are structured and configured to allow the lever arm 124 of the parking brake and emergency brake actuator 126 to extend therethrough. It will be understood that such slotted openings are not required. For example, in embodiments of the drum-in-hat disc brake assembly (not shown) having a "blade lever" type actuator (not shown) rather than the center-pull type actuator having the lever arm 124, the slotted openings 138, 122, 148 are not required (see FIG. 5).

Figure 9:
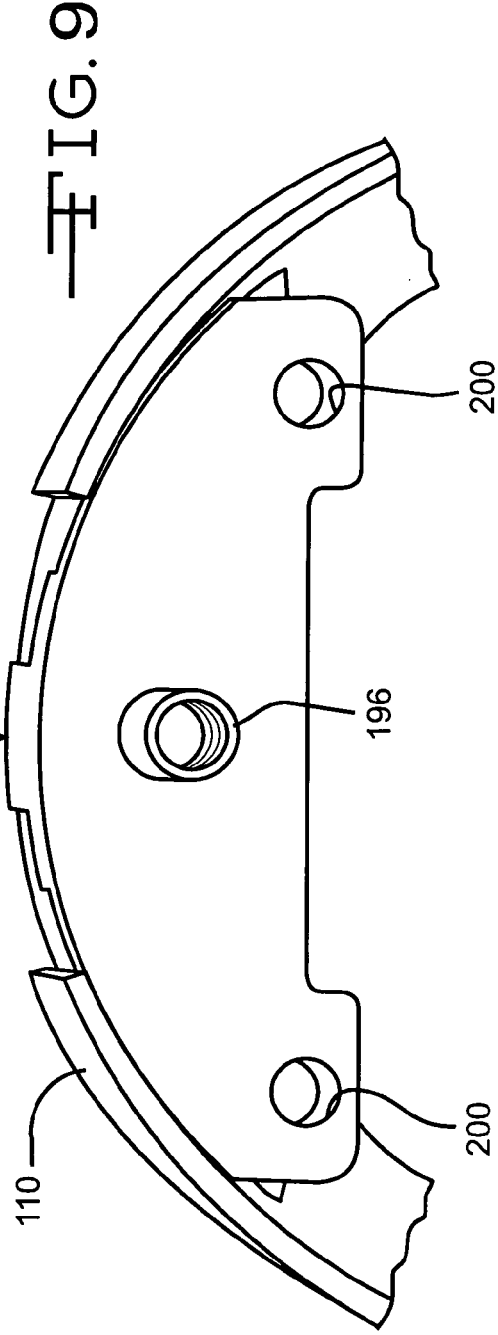
FIG. 9 is a plan view of another alternate embodiment of the anchor illustrated in FIG. 5.

Referring to FIG. 9, a fourth alternate embodiment of the parking brake anchor is shown generally at 202. The parking brake anchor 202 is similar to the parking brake anchor 198, but includes only one stud collar 196 centrally located on the anchor 202. In the illustrated embodiment, the stud collar 196 is centered on the symmetrical centerline of the anchor 202. In the illustrated embodiment, the stud collar 196 is shown as having internal threads. It will be understood however, that such internal threads are not required. For example, the stud collar 196 may be provided without threads and be used to allow any type of fastener to pass therethrough, and/or to locate the anchor 202 relative to the backing plate 104 and the axle flange 106.

Referring now to FIGS. 10A and 10B, a portion of a third and fourth embodiment of a vehicle drum-in-hat disc assembly is indicated generally at 210 and 210', respectively. The vehicle drum-in-hat disc brake assembly 210, 210' is similar to the drum-in-hat disc brake assembly 100 and includes a hydraulically or pneumatically actuated disc service brake (not shown), and a drum-in-hat parking and emergency brake, such as illustrated in FIGS. 2 and 3.

The illustrated vehicle drum-in-hat disc brake assembly 210, 210' includes a drum-in-hat bracket or parking brake tower or anchor 212 (best shown in FIG. 12), a splash shield or backing plate 214, an axle flange 216, a caliper bracket 218, and a drum brake shoe assembly (not shown).

Figure 12:
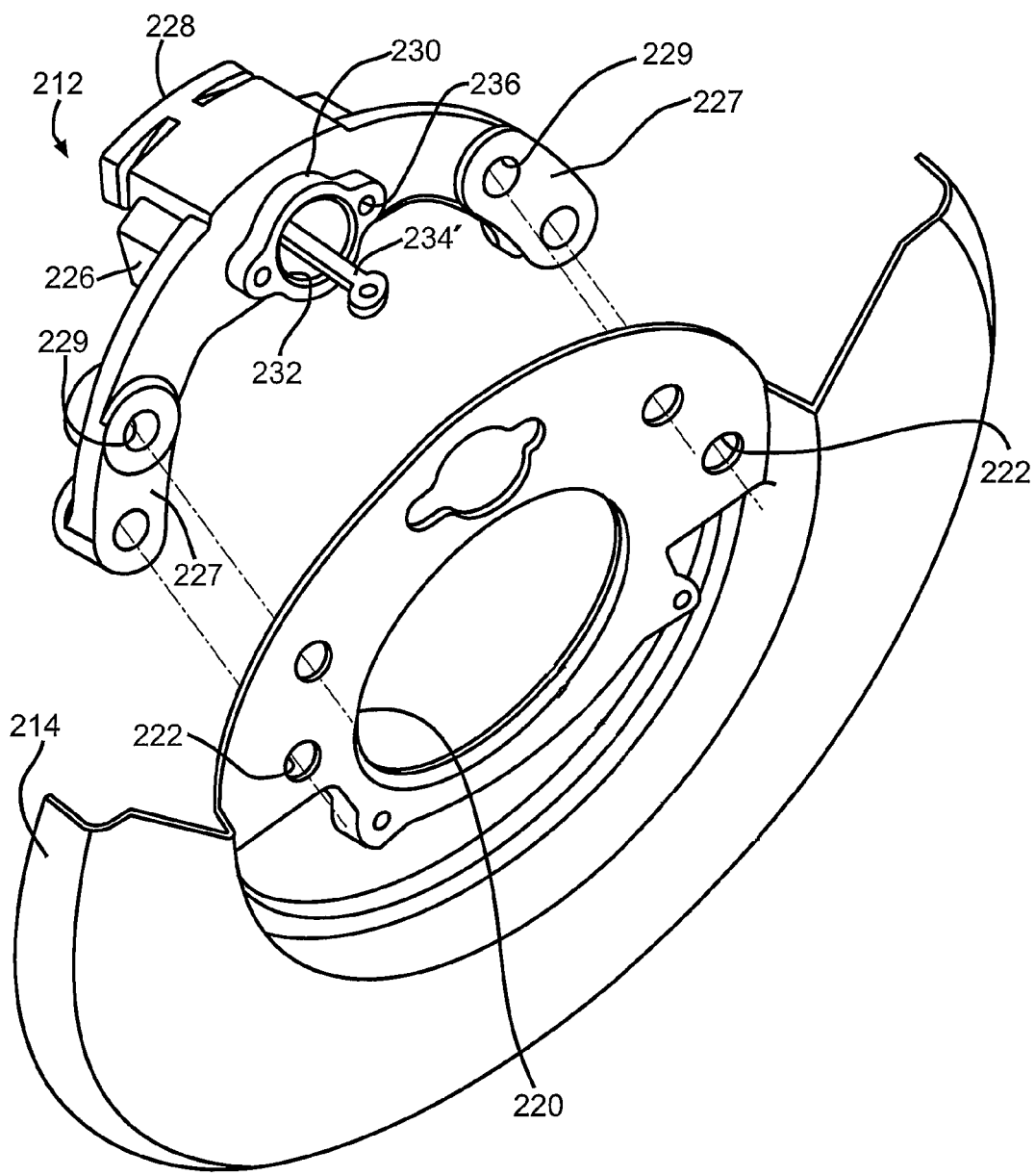
FIG. 12 is a perspective view of a portion of the drum-in-hat disc brake assemblies illustrated in FIGS. 10B and 11B.

The illustrated backing plate 214 of the drum-in-hat disc brake assembly 210, 210' is a stamped metal backing plate and is substantially identical to the backing plate 104. As best shown in FIG. 12, the backing plate 214 includes a relatively large central opening 220 and a plurality of smaller mounting apertures 222 formed therein about the central opening 220. The central opening 220 permits an axle tube (not shown) to extend therethrough. The smaller mounting apertures 222 are adapted to receive suitable fasteners, such as threaded fasteners 224 or other desired fasteners.

The illustrated parking brake anchor 212 is a one-piece casting formed from iron. It will be understood that the brake anchor 212 may be formed from any other desired metal and non-metal. The brake anchor 212 includes an anchor body 226 and an abutment 228. In the illustrated embodiment, legs 227 extend outwardly of the body 226. A pair of mounting apertures 229 are formed in each leg 227 and are structured and configured to receive the threaded fasteners 224 for attaching the axle flange 216 to the backing plate 214 and the anchor 212.

The brake anchor 212 further includes a collar portion 230 having an opening 232 therethrough. The opening 232 is structured and configured to allow the lever arm 234, 234' of a parking brake and emergency brake actuator to extend therethrough. A pair of mounting apertures 236 are formed in the collar portion 230 about the opening 232.

The collar portion 230 of the anchor 212 extends through an opening in the backing plate 214 and is structured and configured for mounting an electronic actuator 238 thereto. The mounting apertures 236 are structured and configured to receive fasteners, such as threaded fasteners (not shown) for attaching the actuator 238 to the collar portion 230. It will be understood that the electronic actuator 238 be any other desired actuator.

The illustrated axle flange 216 may be a metal forging or stamping and includes a flange portion 240. As shown in FIGS. 10A and 10B, the flange portion 240 includes a substantially cylindrical collar portion 241 extending outwardly of the flange portion 240 and defining an opening 242 structured and configured to be secured to an outer surface of an axle tube (not shown), such as by welding. In the illustrated embodiment, legs 244 extend outwardly of the flange portion 240 and define a peripheral edge or substantially U-shaped opening 246. A pair of mounting apertures 248 is formed in each leg 244 and are structured and configured to receive the threaded fasteners 224 for attaching the axle flange 216 to the backing plate 214 and the anchor 212, as best shown in FIG. 12. Two relatively smaller apertures 250 are also formed in the flange portion 240. The smaller apertures 250 are structured and configured to receive threaded fasteners (not shown) or alignment studs (not shown) for positioning the axle flange 216 relative to the backing plate 214. The apertures 250 may receive other suitable fasteners, such as for example, non-threaded fasteners (not shown).

The caliper bracket 218 illustrated in FIGS. 10A and 10B is structured and configured to support a twin pod caliper assembly 252. The illustrated caliper bracket 218 is similar to the caliper bracket 108 illustrated in FIG. 2 and includes a pair of mounting legs or extensions 253. A pair of apertures 254 are formed in the extensions 253. The apertures 254 may be threaded or unthreaded and are structured and configured to receive the threaded fasteners 224 for attaching the caliper bracket 218 and the axle flange 216 to the backing plate 214.

The extensions 253 define a peripheral edge or substantially U-shaped opening 256. When assembled, the U-shaped opening 246 of the axle flange 216 and the U-shaped opening 256 of the caliper bracket 218 cooperate to define an enlarged opening or mounting area 258, which exposes the collar portion 230 and a portion of the surface of the backing plate 214 surrounding the collar portion 230. The exposed portion of the surface of the backing plate 214 surrounding the collar portion 230 is sufficiently large enough to receive and support the electronic actuator 238.

It will be understood however, that the electronic actuator 238 is not required, and the drum-in-hat disc brake assembly 210' may be provided with the lever arm 234, 234' for connection to an actuation cable (not shown).

Figure 11B:
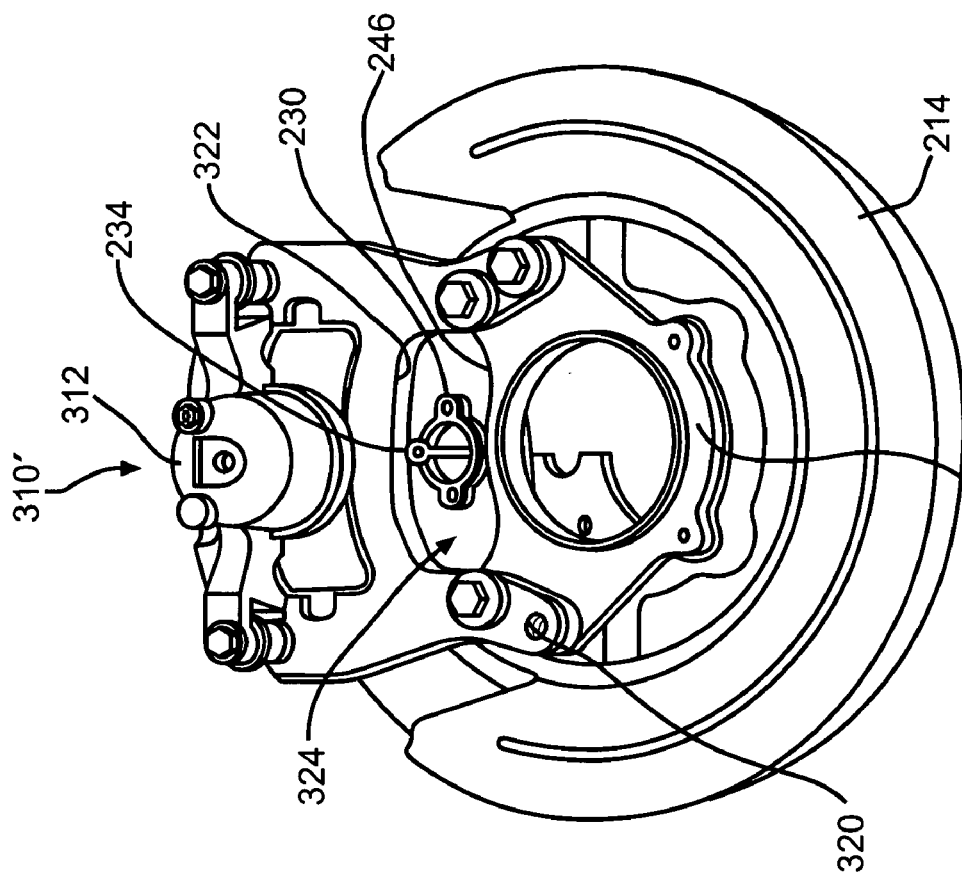
FIG. 11B is a perspective view of a portion of a sixth embodiment of the drum-in-hat disc brake assembly.
Figure 11A:
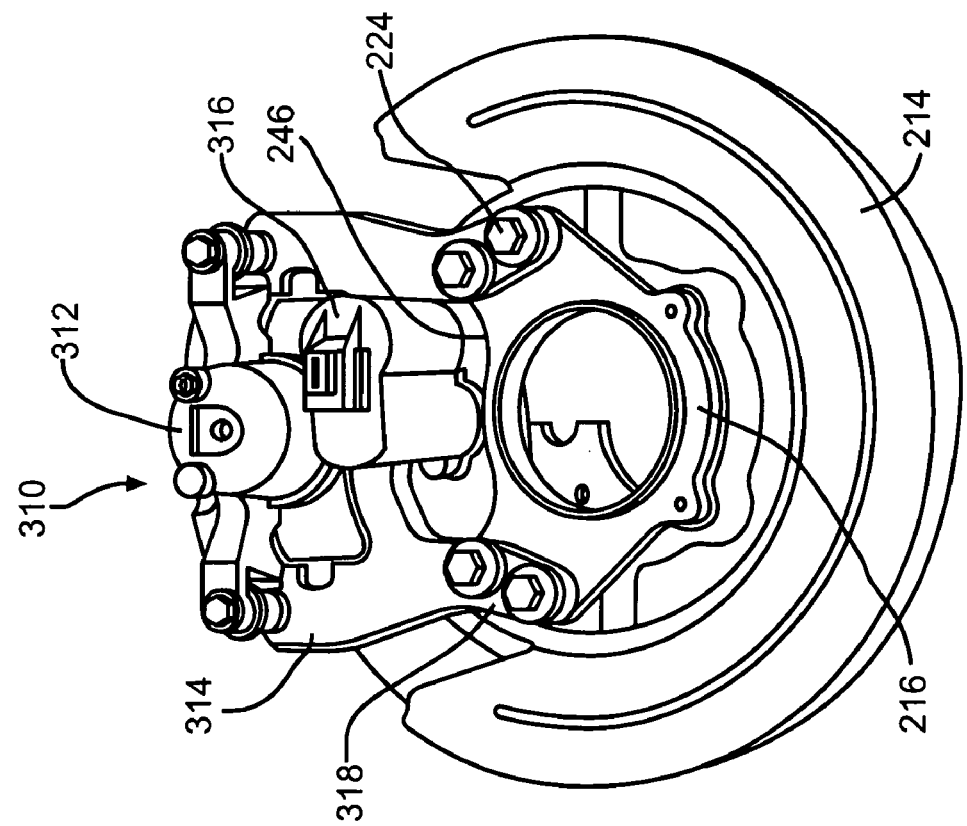
FIG. 11A is a perspective view of a portion of a fifth embodiment of the drum-in-hat disc brake assembly.

Referring now to FIGS. 11A and 11B, and using like reference numbers to indicate corresponding parts, there is indicated generally at 310 and 310' a portion of a fifth and sixth embodiment, respectively, of a vehicle drum-in-hat disc assembly. The vehicle drum-in-hat disc brake assembly 310 310' is substantially identical to the drum-in-hat disc brake assembly 210, 210', except that the brake assembly 310, 310' includes an alternate embodiment of a caliper 312, a caliper bracket 314, and an actuator 316.

The illustrated vehicle drum-in-hat disc brake assembly 310, 310' includes the drum-in-hat bracket or parking brake tower or anchor 212 (best shown in FIG. 12), the backing plate 214, the axle flange 216, and a drum brake shoe assembly (not shown).

The collar portion 230 of the anchor 212 extends through the backing plate 214 and is structured and configured for mounting an electronic actuator 316 thererto. It will be understood that the electronic actuator 238 be any other desired actuator.

The caliper bracket 314 illustrated in FIGS. 11A and 11B is structured and configured to support a single pod caliper assembly 312. The illustrated caliper bracket 314 is similar to the caliper bracket 218 illustrated in FIGS. 10A and 10B and includes a pair of mounting legs or extensions 318. A pair of apertures 320 are formed in the extensions 318. The apertures 320 may be threaded or unthreaded and are structured and configured to receive the threaded fasteners 224 for attaching the caliper bracket 314 and the axle flange 216 to the backing plate 214.

The extensions 318 define a peripheral edge or substantially U-shaped opening 322. When assembled, the U-shaped opening 246 of the axle flange 216 and the U-shaped opening 322 of the caliper bracket 314 cooperate to define an enlarged opening 324, which exposes the collar portion 230 and a portion of the surface of the backing plate 214 surrounding the collar portion 230. The exposed portion of the surface of the backing plate 214 surrounding the collar portion 230 is sufficiently large enough to receive and support the electronic actuator 316.

It will be understood however, that the electronic actuator 316 is not required, and the drum-in-hat disc brake assembly 310' may be provided with the lever arm 234, 234' for connection to an actuation cable (not shown).

The principle and mode of operation of the drum-in-hat disc brake assembly have been described in its various embodiments. However, it should be noted that the drum-in-hat disc brake assembly described herein may be practiced otherwise than as specifically illustrated and described without departing from its scope.

What is claimed is:

1. A drum-in-hat disc brake assembly having a disc service brake and a drum-in-hat parking and emergency brake, the drum-in-hat disc brake assembly comprising:
    a backing plate adapted to support a drum brake shoe assembly of the drum-in-hat parking and emergency brake, the backing plate having a centrally located opening defining an axis, at least two smaller mounting apertures formed therein about the centrally located opening thereof, and a slotted opening;
    a parking brake anchor having a body and an abutment extending outward of the body and further including a collar portion integrally formed with and extending outward of the body opposite the abutment and having an opening formed therein, wherein the collar portion extends through the slotted opening in the backing plate, and wherein a lever arm of a parking and emergency brake actuator extends through the opening in the collar portion;
    wherein the collar portion is configured to have an actuator mounted thereto;
    an axle flange having at least two mounting apertures formed therein, the axle flange structured and configured to be secured to an axle tube which in turn is structured and configured to extend through the centrally located opening of the backing plate; and
    a caliper bracket adapted to support a disc brake caliper assembly of the disc service brake, the caliper bracket having at least two mounting apertures formed therein;
    wherein the axle flange includes a flange portion and a substantially cylindrical portion extending outwardly of the flange portion, an inner edge surface of the cylindrical portion defining an opening structured and configured to be secured to an outer surface of the axle tube extending therethrough.

2. The drum-in-hat disc brake assembly according to claim 1, wherein the axle flange includes an aperture formed therein, the aperture structured and configured for receiving a threaded fastener, the threaded fastener securing the axle flange to the backing plate.

3. A drum-in-hat disc brake assembly having a disc service brake and a drum-in-hat parking and emergency brake, the drum-in-hat disc brake assembly comprising:
    a backing plate adapted to support a drum brake shoe assembly of the drum-in-hat parking and emergency brake;
    a caliper bracket adapted to support a disc brake caliper assembly of the disc service brake and mounted to the backing plate, the caliper bracket having a peripheral edge defining a substantially U-shaped opening;
    an axle flange mounted to the backing plate and having a peripheral edge defining a substantially U-shaped opening; and
    a parking brake anchor having a body and an abutment extending outward of the body;
    wherein the parking brake anchor further includes a collar portion integrally formed with and extending outward of the body opposite the abutment and having an opening formed therein and wherein a lever arm of a parking and emergency brake actuator extends through the opening in the collar portion;
    wherein the collar portion is configured to have an actuator mounted thereto;
    wherein the collar portion extends through an opening in the backing plate; and
    wherein the substantially U-shaped opening of the caliper bracket is spaced apart from the axle tube opening formed in the axle flange and spaced apart from the substantially U-shaped opening of the axle flange such that an area between the substantially U-shaped opening of the axle flange and the substantially U-shaped opening of the caliper bracket defines a mounting area exposing the collar portion and a portion of a surface of the backing plate surrounding the collar portion.

4. The drum-in-hat disc brake assembly according to claim 3, further including an electronic actuator mounted to the collar portion and operatively connected to the lever arm

* * * * *